Figure 1:
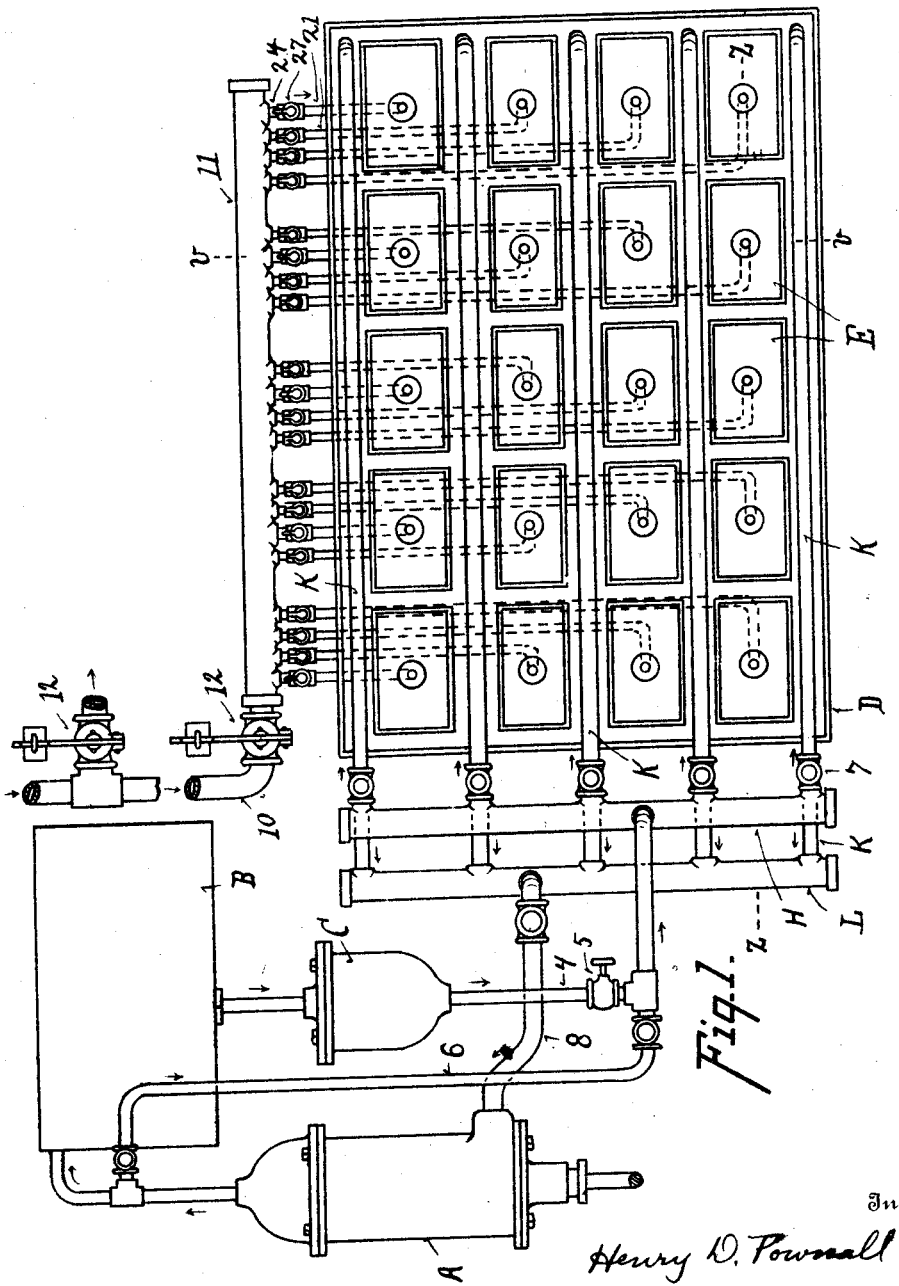

H. D. POWNALL.
ICE MACHINE.
APPLICATION FILED JAN. 24, 1913.
1,180,532.
Patented Apr. 25, 1916.
3 SHEETS—SHEET 2.
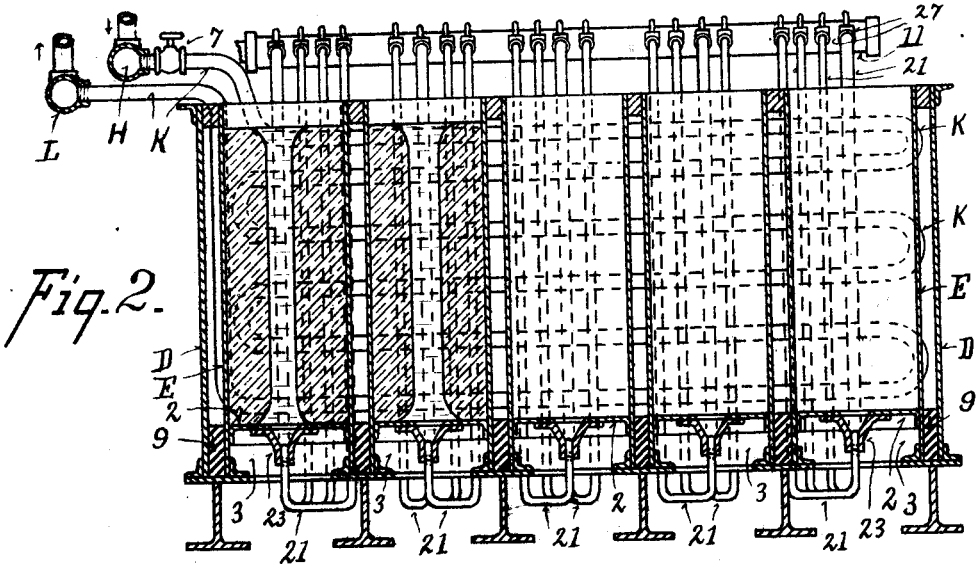
Fig. 2.
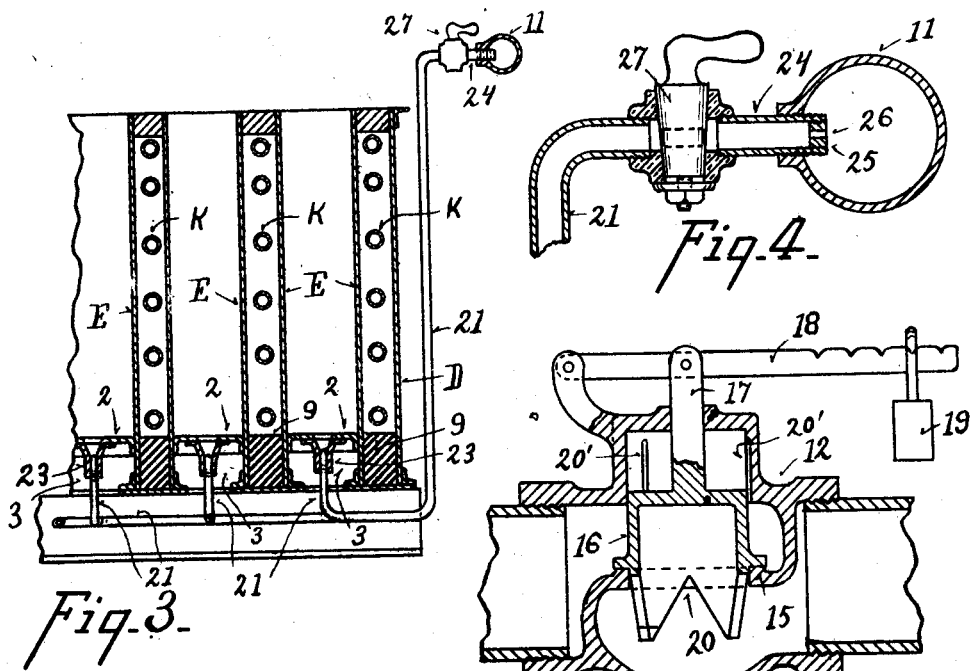
Fig. 3.
Fig. 4.
Fig. 5.
Witnesses
Walter F. Murray
B. R. Kropf
Inventor
Henry D. Pownall
By C. W. Miles
Attorney

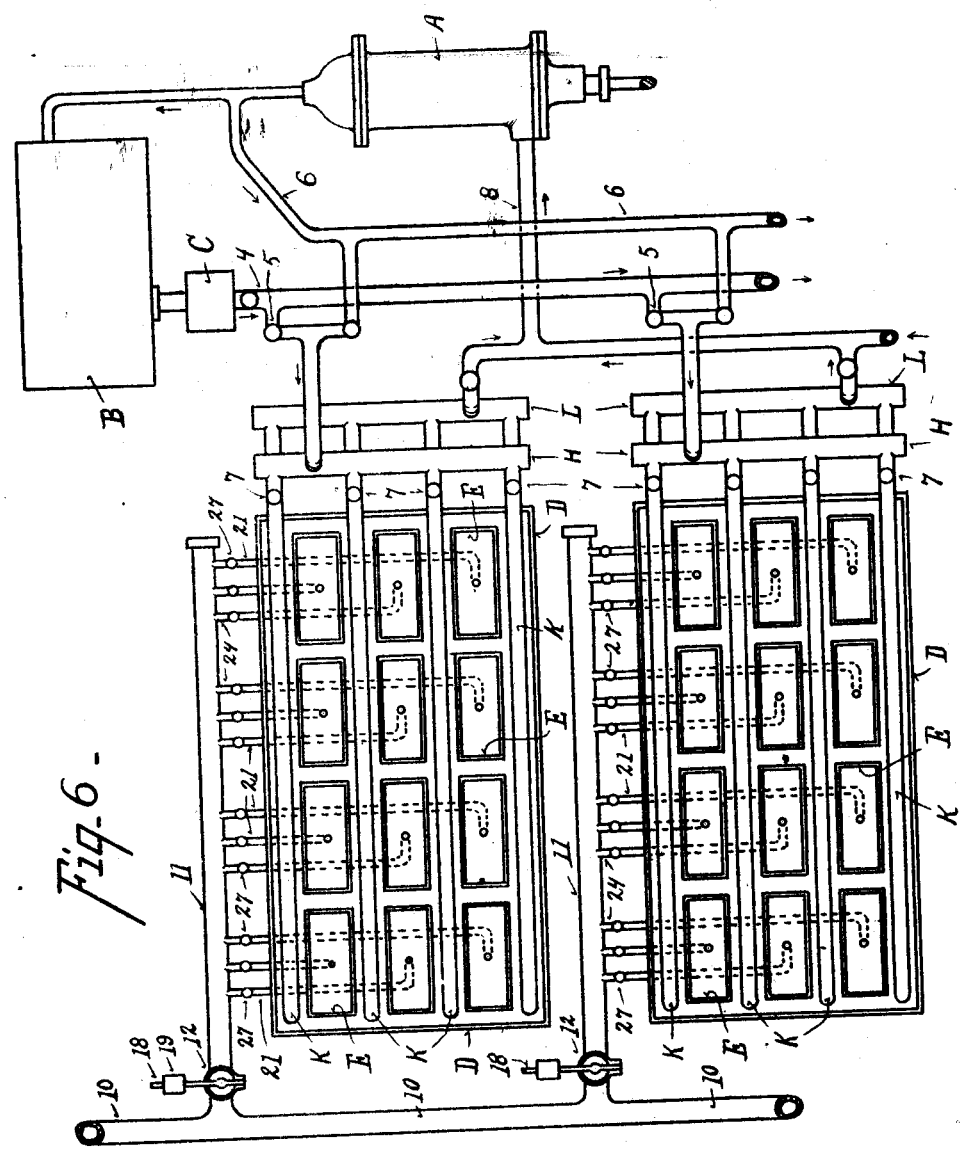

UNITED STATES PATENT OFFICE.

HENRY D. POWNALL, OF CANTON, OHIO.

ICE-MACHINE.

1,180,532. Specification of Letters Patent. Patented Apr. 25, 1916.

Application filed January 24, 1913. Serial No. 743,983.

*To all whom it may concern:*

Be it known that I, HENRY D. POWNALL, a citizen of the United States, residing at Canton, in the county of Stark and State of Ohio, have invented certain new and useful Improvements in Ice-Machines, of which the following is a specification.

My invention relates to improvements in ice machinery.

One of its objects is to provide an improved arrangement and combination of brine tank, ice molds, and means for controlling the temperature of the brine.

Another object is to provide improved means to secure pure and clear ice in ice molds permanently located in the brine tank.

Another object is to provide improved means for releasing the ice from the ice molds.

Another object is to provide improved means and mechanism to supply air under pressure to the interior of the ice molds.

My invention further comprises certain details of form, combination and arrangement, all of which will be fully set forth in the description of the accompanying drawings, in which:

Figure 1 is a diagram of a portion of an ice producing system in which a brine tank unit is illustrated in top plan, and a compressor, condenser, and receiver in side elevation, with their respective connections, and embodying my improvements. Fig. 2 is a vertical section through one of the brine tank units on line $z\ z$ of Fig. 1. Fig. 3 is a vertical section through a portion of a brine tank unit on line $v\ v$ of Fig. 1. Fig. 4 is an enlarged sectional detail through a portion of the air supply conduit, being a section on line $v\ v$ of Fig. 1. Fig. 5 is an enlarged sectional detail through one form of controlling valve for the air supply. Fig. 6 is a diagram similar to Fig. 1, illustrating the connection and use of a series of brine tank units.

The accompanying drawings represent the preferred embodiment of my invention, in which—

A represents an ice machine compressor, B represents an ice machine condenser, and C a receiver to receive and store the liquefied refrigerant.

D represents one of several tank units which together constitute the brine tank or ice producing mechanism. The respective brine tank units each comprise a brine tank having side walls and preferably a perforated bottom with ice molds E consisting of vertical sheet metal tubes located close to each other within said tank and over the perforations in the bottom of the tank to which bottom said ice molds are detachably attached. The bottoms 2 of the ice molds are preferably located some distance above the bottom of the brine tank, so as to form chambers or recesses 3 beneath the bottoms of the ice molds.

H represents a header for each brine tank unit, which header is arranged to be supplied either with liquid refrigerant from the receiver C through the pipe 4 and valve 5 or with heated refrigerant vapor led either from the compressor or the condenser through the valve controlled pipe 6.

K represent a series of expansion coils which are immersed in the brine of the brine tank unit between the ice molds and in such manner that they can be conveniently detached and removed if required. Said expansion coils are each connected at one end to the header H and at the opposite end to the header L, being preferably separately controlled by expansion valves 7. The header L serves to collect the refrigerant from the several coils K and to return it through pipe 8 to the compressor. By mounting the ice molds close together the brine containing capacity of the brine tank units is very small compared with the fresh water holding capacity of the ice molds, hence the brine during the freezing operation is capable of being maintained at a practically uniform temperature throughout, and without the necessity of mechanically circulating the brine, although the brine may be agitated or circulated if desired. Also when it is desired to release the ice from the molds, after the freezing operation is complete, by the introduction of heated refrigerant through the pipe 6, the temperature of the entire body of brine in the brine tank unit may be raised in a relatively short period, so as to release all the blocks of ice in one unit at the same time so that they may be removed, and the ice molds refilled with fresh water for another freezing operation.

Before introducing brine into the brine tank units a material 9, such as pitch for instance, having heat insulating and water proofing qualities is introduced in a fluid or semi-fluid condition so as to occupy the space at the bottom of the brine tank units between the ice molds up to about the level of the bottoms of the ice molds. The material 9 upon becoming solid or practically solid forms non-conducting side walls for the recesses 3 and prevents the brine coming in contact with the side walls of said recesses, and further serves to seal all joints at the bottom of the tank against leakage of brine.

I preferably provide for introducing air under pressure through or at the bottom of the ice molds in order that the fresh water may be agitated by bubbles of air rising through it during the freezing operation in order that air bubbles, silt, and other foreign matter may be detached from the face of the ice and prevented from being frozen into the block of ice. In order to insure a uniform supply of air to each ice mold, and to regulate or vary the pressure of the air supplied to meet the requirements of the gradually diminishing quantity of water in the molds during the freezing operation I provide a main conduit 10 for air under pressure from a pump or blower to the various brine tank units. Headers 11 are provided for each brine tank unit into which the air is supplied from the conduit 10 through a pressure regulating valve 12, such for instance as illustrated in Fig. 5, in which 14 represents the valve casing, 15 the valve seat, and 16 the valve, which is provided with a stem 17 pivotally connected to a lever 18, which lever is provided with an adjustable weight 19 to yieldingly hold the valve 16 to its seat. The pressure of the air against the under side of the valve 16 lifts the valve from its seat to admit air to the header 11 through the V-shaped notches 20, while the air in the header 11 reacts upon the upper face of the valve through ports 20″ to variably assist the weight 19 in holding the valve to its seat, thus maintaining a substantially uniform air pressure within the header, which may be regulated to suit the conditions as freezing progresses and the volume of water to be agitated decreases by shifting the weight 19 along the lever 18.

The headers 11 are located above the level of the water in the ice molds, so that when the air supply to the headers ceases from any cause the water cannot flow into and fill the headers 11. A series of independent branch pipes 21 lead from the headers 11 to positions beneath the respective ice molds, where they are connected with connecting members 23 attached to the bottoms of the ice molds. In order to prevent foreign matter getting into and coagulating or accumulating and stopping up these branch pipes 21, and also to provide for a substantially even and reliable distribution of air to the several molds, and a control thereof, I provide nipples 24 above the water level threaded into the headers 11 preferably so that their inner ends will project some distance into the interior of the header. The inner ends of the nipples 24 are fitted with plugs 25 each pierced with an orifice 26 of sufficient size to supply the requisite amount of air, and from its position and small diameter not liable to be closed by or to admit foreign matter capable of stopping the branch pipes. Regulating cocks 27 for the respective branch pipes 21 are located at the opposite ends of the nipples 24 above the level of the water in the ice molds, and provide for cutting off or decreasing the supply to any one of the branch pipes 21 should such regulation be necessary. The orifices 26 and cocks 27 provide for a substantially uniform pressure in and distribution of air to the respective pipes 21 and provide for the air driving the water out of the respective branches 21 or finding a passage through said pipes and evenly and reliably distributing air to the several ice molds, and also to cut off the air supply to any one of the molds. When the air pressure ceases, the water from the molds flows into and fills the branches 21 and 22 to a point slightly below the cocks 27, from whence it is returned to the ice molds when the blower is again put in operation.

In practice the ice molds may be filled with fresh water from the top, or they may be filled by means of permanent pipe connections, not shown, through the bottom of the molds. In practice when the freezing operation has progressed to about the point indicated in the two left hand molds of Fig. 2, the water remaining unfrozen and containing the sediment and impurities is removed, either from the top or bottom of the molds, and a fresh supply of either raw or distilled water is admitted, and the freezing operation continued until the center or core of the ice block becomes solid or practically all of the water therein has become solidified.

Fig. 6 illustrates the use of a series of brine tank units with their connections to one compressor and condenser, to provide for the alternate freezing and releasing operations as applied to each brine tank unit as a whole, and which operations may thus be carried on throughout an entire refrigerating season without circulating brine to or from the tank units or removing any of the ice molds, or disturbing the assembly relations of tank unit components, and solely by manipulation of the controlling valves.

The mechanism herein illustrated and described is capable of considerable modification without departing from the principle of my invention.

Having described my invention, what I claim is:

1. An ice machine brine tank composed of a plurality of independently operable brine tank units each comprising a stationarily located tank to contain a non-congealable cooling medium, a plurality of ice molds located in said tank to be refrigerated through their side walls by said cooling medium, an air chamber to be supplied with air under pressure and located above the level of the water in said ice molds, independent conduits from said chamber to discharge air to the lower portion of the interior of said ice molds, and means located at points in said conduits above the level of the water in said ice molds to limit the flow of air from said air chamber to said ice molds.

2. In an apparatus to produce artificial ice, a tank to contain a non-congealing cooling medium, a plurality of ice molds located in said tank so as to be refrigerated through their side walls by said cooling medium, an air chamber above the level of the water in said ice molds, separate pipe connections leading from said air chamber to the bottoms of said respective ice molds through openings in the bottom of said tank to supply air under pressure to said respective ice molds, each of said air pipes having a section of restricted cross sectional area located above the level of the water in said ice molds to limit the quantity of air supplied to the respective ice molds.

3. In an ice machine, a tank to contain a non-congealing cooling medium, a plurality of ice molds located in said tank so as to be refrigerated through their side walls by said cooling medium, a chamber to supply air under pressure located above the level of the water in said ice molds, independent conduits leading from said air chamber to bottom of said respective ice molds, through the bottom of said tank, and means located in said conduits above the level of the water in said molds to limit the supply of air through said several conduits.

4. In an ice machine a tank to contain a non-congealing cooling medium, a plurality of ice molds located in said tank so as to be refrigerated through their side walls by said cooling medium, a chamber to be supplied with air under pressure and located above the level of the water in said ice molds, independent conduits leading from said air chamber to the bottoms of said respective ice molds, said conduits each having a section of reduced area located above the level of the water in said ice molds to limit the flow of air from said air chamber to said ice molds.

5. In an ice machine a tank to contain a non-congealing cooling medium, a plurality of ice molds located in said tank so as to be refrigerated through their side walls by said cooling medium, a chamber to be supplied with air under pressure and located above the level of the water in said ice molds, independent conduits leading from said air chamber to the bottoms of said respective ice molds, and means to limit the flow of air from said chamber to said ice molds located at points in said conduits above the level of the water in said ice molds.

6. In an ice machine a tank to contain a non-congealing cooling medium, a plurality of ice molds located in said tank so as to be refrigerated through their side walls by said cooling medium, a chamber to be supplied with air under pressure and located above the level of the water in said ice molds, independent conduits leading from said air chamber to the bottoms of said respective ice molds, said conduits each having a section of reduced area and an air controlling valve located above the level of the water in said ice molds to limit and control the flow to said ice molds.

7. In an ice machine, a plurality of tanks each to contain a non-congealing cooling medium, a plurality of ice molds located in each of said respective tanks so as to be refrigerated through their side walls by the cooling medium of said tanks, separate air supply chambers for said respective tanks located above the water level of the ice molds thereof, conduits leading from said air chambers to the bottoms of the several ice molds of their respective tanks through the bottoms of said tanks, and controllable means to maintain substantially uniform, but relatively different amounts of air pressure in said respective air chambers.

8. In an ice machine, a tank to contain a non-congealing cooling medium, a plurality of ice molds located in said tank so as to be refrigerated through their side walls by said cooling medium, an air supply chamber located above the level of the water in said ice molds, conduits leading from said air chamber to the bottoms of said respective ice molds through the bottom of said tank, and means to automatically maintain a substantially uniform pressure of air in said chamber.

9. In an ice machine, a plurality of tanks each to contain a non-congealing cooling medium, a plurality of ice molds located in said respective tanks so as to be refrigerated through their side walls by said cooling medium, separate air supply chambers for said respective tanks to receive air under pressure from a common source, controllable means to automatically supply air at substantially uniform but relatively different pressures to said respective air chambers, and conduits leading from said respective air chambers to the bottoms of the ice molds of their respective tanks through the bottoms of said tanks.

In testimony whereof I have affixed my signature in presence of two witnesses.

HENRY D. POWNALL.

Witnesses:
URBAN A. WERNET,
DAVID B. DAY.